United States Patent
Gunawan et al.

(10) Patent No.: US 10,613,249 B2
(45) Date of Patent: Apr. 7, 2020

(54) PARALLEL DIPOLE LINE TRAP GRAVIMETER

(71) Applicant: International Business Machines Corporation, Armonk, NY (US)

(72) Inventors: Oki Gunawan, Westwood, NJ (US); Hendrik F. Hamann, Yorktown Heights, NY (US); Wang Zhou, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 15/490,084

(22) Filed: Apr. 18, 2017

(65) Prior Publication Data
US 2018/0299581 A1 Oct. 18, 2018

(51) Int. Cl.
*G01V 7/04* (2006.01)
*G01V 7/06* (2006.01)

(52) U.S. Cl.
CPC . *G01V 7/04* (2013.01); *G01V 7/06* (2013.01)

(58) Field of Classification Search
CPC .................................. G01V 7/04; G01V 7/06
See application file for complete search history.

(56) References Cited

U.S. PATENT DOCUMENTS

| | | | |
|---|---|---|---|
| 6,314,809 B1 | 11/2001 | Kasevich et al. | |
| 6,799,462 B1 | 10/2004 | Berstis | |
| 7,597,002 B2 | 10/2009 | Moser et al. | |
| 7,859,157 B2 | 12/2010 | Baur | |
| 8,106,660 B1 | 1/2012 | Merewether et al. | |
| 8,616,054 B2 | 12/2013 | Paros et al. | |
| 8,895,355 B2 | 11/2014 | Cao et al. | |
| 9,093,377 B2 | 7/2015 | Cao et al. | |
| 9,236,293 B2 | 1/2016 | Cao et al. | |
| 9,263,669 B2 | 2/2016 | Cao et al. | |
| 2009/0160279 A1* | 6/2009 | Baur | F16C 32/04 310/90.5 |
| 2009/0284258 A1 | 11/2009 | Morrison et al. | |
| 2010/0147071 A1 | 6/2010 | Schwartz et al. | |

(Continued)

OTHER PUBLICATIONS

R.P. Middlemiss et al., "Measurement of the Earth tides with a MEMS gravimeter," Nature, vol. 531, pp. 614-617 (Mar. 2016) (16 total pages).

(Continued)

*Primary Examiner* — David Z Huang
(74) *Attorney, Agent, or Firm* — Vazken Alexanian; Michael J. Chang, LLC

(57) ABSTRACT

A highly sensitive gravimeter using a magnetic parallel dipole line (PDL) trap system is provided. In one aspect, a gravimeter includes: a vacuum enclosure; a PDL trap within the vacuum enclosure, the PDL trap having a pair of dipole line magnets, and a diamagnetic rod levitating in between the dipole line magnets; and a heater and temperature sensor within the vacuum enclosure configured to maintain a constant temperature within the vacuum enclosure that is greater than a temperature outside of the vacuum enclosure and precision frequency measurement system. The frequency of the oscillation of the trapped diamagnetic rod will yield the local gravitational acceleration. Methods for measuring a local gravitational field using the present gravimeter are also provided.

24 Claims, 8 Drawing Sheets

(56) References Cited

U.S. PATENT DOCUMENTS

| | | |
|---|---|---|
| 2013/0152680 A1 | 6/2013 | Sackett et al. |
| 2014/0007677 A1 | 1/2014 | Italiano et al. |
| 2014/0292155 A1 | 10/2014 | Ballandras et al. |
| 2015/0037128 A1 | 2/2015 | Kustler |
| 2015/0331142 A1 | 11/2015 | Ammar et al. |
| 2016/0041300 A1 | 2/2016 | Meyer |

OTHER PUBLICATIONS

Gunawan et al., "A parallel dipole line system," Applied Physics Letters 106, pp. 062407-1-5 (Feb. 2015).

Gunawan et al., "The one-dimensional camelback potential in the parallel dipole line trap: Stability conditions and finite size effect," J. Applied Physics, vol. 121, 133902 (Apr. 2017) (10 pages).

\* cited by examiner

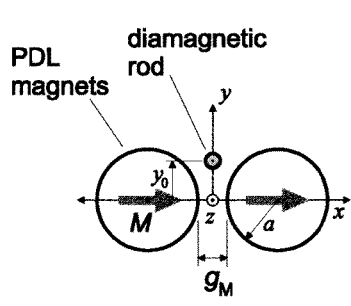
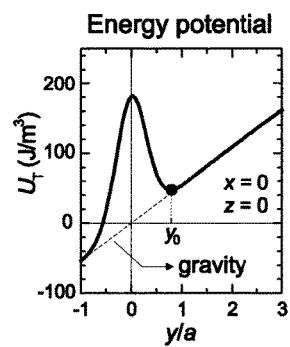
FIG. 1A  FIG. 1B
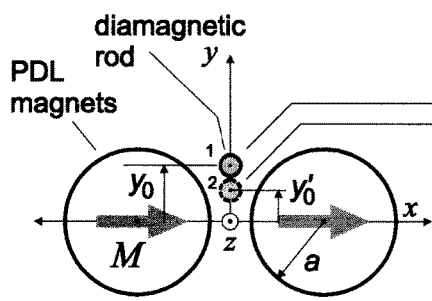
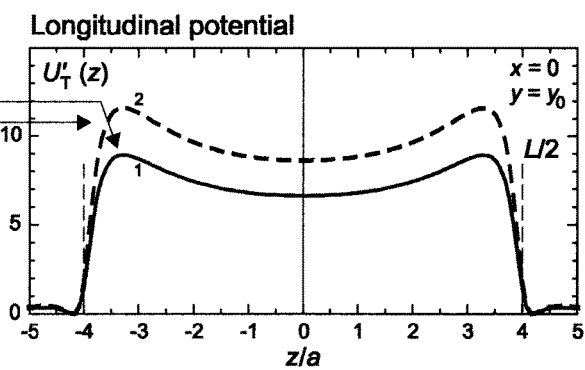
FIG. 2

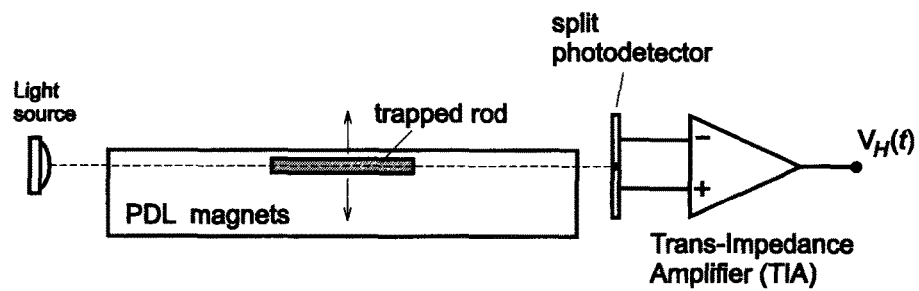
FIG. 13
FIG. 14
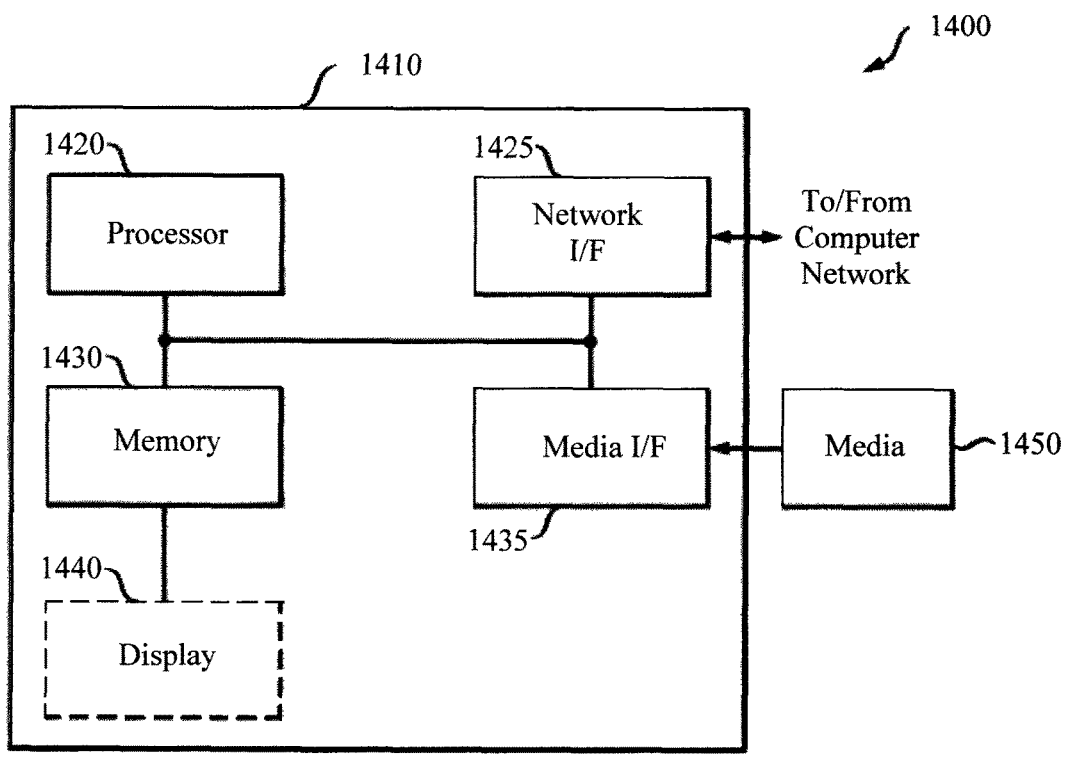

PARALLEL DIPOLE LINE TRAP GRAVIMETER

FIELD OF THE INVENTION

The present invention relates to magnetic parallel dipole line (PDL) trap systems, and more particularly, to a highly sensitive gravimeter using a PDL trap system.

BACKGROUND OF THE INVENTION

A highly sensitive gravimeter system is important for measuring small variations of local gravitational field for various applications in petroleum, geophysics, or civil engineering. For instance, examples include the detection of mining or hydrocarbon reserves, the detection of magma build-up before volcanic eruptions, and subterranean tunnels. See, for example, R. P. Middlemiss et al., "Measurement of the Earth tides with a MEMS gravimeter," Nature, vol. 531, pgs. 614-617 (March 2016) (16 total pages) (hereinafter "Middlemiss").

Several technologies exist for detecting variations in a local gravitational field, such as pendulum-based systems, free-fall systems, spring-based systems, superconducting gravimeters and atom interferometers. However, while precise, these systems are very expensive (>$100,000), bulky (>8 kg), and not portable.

These drawbacks have motivated the search for lower cost high sensitivity gravimeter systems, such as the microelectromechanical system (MEMS) system described in Middlemiss. While very sensitive, a MEMS gravimeter has several notable drawbacks. The MEMs device uses a silicon cantilever, with limited oscillator quality factor (Q) and the cantilever spring constant which could be temperature sensitive or change over time. Thus, inaccurate readings may be obtained unless regular recalibrations are performed.

Accordingly, an improved low-cost, high-sensitivity gravimeter would be desirable.

SUMMARY OF THE INVENTION

The present invention provides a highly sensitive gravimeter using a magnetic parallel dipole line (PDL) trap system. In one aspect of the invention, a gravimeter is provided. The gravimeter includes: a vacuum enclosure; a PDL trap within the vacuum enclosure, the PDL trap having a pair of dipole line magnets, and a diamagnetic rod levitating in between the dipole line magnets; a heater within the vacuum enclosure; a temperature sensor within the vacuum enclosure; a thermostat circuit connected to the heater and the temperature sensor configured to maintain a constant temperature within the vacuum enclosure that is greater than a temperature outside of the vacuum enclosure; and level adjusters configured to level the gravimeter.

In another aspect of the invention, a method for measuring a local gravitational field is provided. The method includes: providing a gravimeter including a vacuum enclosure, a PDL trap within the vacuum enclosure, a heater within the vacuum enclosure, and a temperature sensor within the vacuum enclosure, wherein the PDL trap has a pair of dipole line magnets, and a diamagnetic rod levitating in between the dipole line magnets; maintaining a constant temperature within the vacuum enclosure that is greater than a temperature outside of the vacuum enclosure using the heater; initiating oscillations of the diamagnetic rod in the PDL trap; determining an oscillation frequency $f_0$ of the diamagnetic rod in the PDL trap; and calculating the local gravitational field using $f_0$, wherein $f_0$ varies depending on a levitation height of the diamagnetic rod in the PDL trap, and wherein the levitation height of the diamagnetic rod varies depending on the local gravitational field.

A more complete understanding of the present invention, as well as further features and advantages of the present invention, will be obtained by reference to the following detailed description and drawings.

BRIEF DESCRIPTION OF THE DRAWINGS

FIG. 1A is a diagram illustrating a parallel dipole line (PDL) trap with a diamagnetic rod at a levitation height $y_0$ above the PDL magnets according to an embodiment of the present invention;

FIG. 1B is a diagram illustrating energy potential for the PDL trap of FIG. 1A with the diamagnetic rod at a levitation height $y_0$ above the PDL magnets according to an embodiment of the present invention;

FIG. 2 is a diagram illustrating a change in potential with a change in the levitation height according to an embodiment of the present invention;

FIG. 13 is a diagram illustrating a setup to precisely measure the levitation height of the trapped rod using a split photodetector according to an embodiment of the present invention; and FIG. 14 is a diagram illustrating an exemplary apparatus that can be configured to serve as the microcomputer in the present gravimeter device according to an embodiment of the present invention.

DETAILED DESCRIPTION OF PREFERRED EMBODIMENTS

Figure 3:
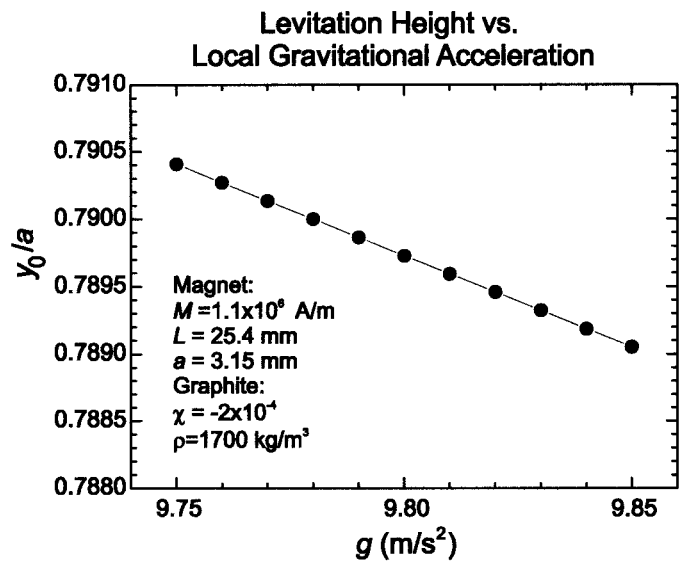
FIG. 3 is a plot correlating the levitation height of the diamagnetic rod with local gravitational acceleration g according to an embodiment of the present invention.

Provided herein is a high-sensitivity gravimeter utilizing a parallel dipole line (PDL) trap system consisting of a pair of transverse cylindrical magnets (TCMs). A diamagnetic cylindrical object such as a diamagnetic (e.g., graphite) rod is trapped at the center of the PDL trap. The diamagnetic cylindrical object is confined in a weak one-dimensional camelback magnetic potential along the longitudinal axis of the trap that provides stable trapping. See, for example, Gunawan et al., "A parallel dipole line system," Applied Physics Letters 106, pp. 062407-1-5 (February 2015) (hereinafter "Gunawan 2015"); and U.S. Pat. Nos. 8,895,355, 9,093,377, 9,236,293, and 9,263,669 all issued to Cao et al., entitled "Magnetic Trap for Cylindrical Diamagnetic Materials," the contents of each of which are incorporated by reference as if fully set forth herein.

At rest, the diamagnetic cylindrical object levitates above the magnets at the center of the PDL trap. Due to the camelback magnetic potential, the diamagnetic cylindrical object will oscillate back and forth when the object is displaced (e.g., using an electrode enclosing the object and with a bias voltage applied to the electrode—see below).

The height at which the trapped diamagnetic cylindrical object levitates above the magnets (i.e., levitation height) is a function of gravity. For instance, the levitation height represents a balance between the magnetic repulsive force (which levitates the diamagnetic rod) and the force of gravity (which pulls the diamagnetic rod down). Thus, with a weaker gravitational field the levitation will be higher, while with a higher gravitational field the levitation height will be lower. Further, different levitation heights yield a different camelback magnetic potential, and hence a different oscillation frequency of the diamagnetic object in the trap. Thus, an observed oscillation frequency can be used to quantify a local gravitational field.

While an "average" value of gravitational acceleration at the earth's surface is about 9.8 m/s², the precise value varies (up to about 0.4% variation) depending on the exact location. This is because the earth is not a perfect sphere, but rather is flatter at the poles and bulges at the equator. Thus, differing gravitational fields are experienced as one moves from the poles to the equator or as one moves to different latitudes.

FIGS. 1A and 1B, and FIG. 2 schematically illustrate how the PDL trap can be utilized to perform gravitational field or acceleration (g) measurement. FIGS. 1A and 2 both provide front view depictions of the PDL trap, and more specifically of the trapped diamagnetic cylindrical object (in this case a diamagnetic rod) levitating above the PDL magnets. FIGS. 1B and 2 depict the energy potential and the change in potential with a change in the levitation height. It is notable that, in this example, the levitation height $y_0$ of the diamagnetic rod is changed by varying a gap $g_M$ in between the PDL magnets. Basically, increasing the gap $g_M$ between the PDL magnets decreases the levitation height of the diamagnetic rod, and vice versa. See, for example, U.S. patent application Ser. No. 15/131,566 by Oki Gunawan, entitled "Parallel Dipole Line Trap with Variable Gap and Tunable Trap Potential" (hereinafter "U.S. patent application Ser. No. 15/131,566"), the contents of which are incorporated by reference as if fully set forth herein. However, this is being done merely to show the effect of levitation height $y_0$ on the camelback magnetic potential. As will be described in detail below, changes in the gravitational field will change the levitation height of the diamagnetic rod (i.e., with the gap $g_M$ between the PDL magnets, if any, remaining constant).

In FIG. 1B, the diamagnetic rod has a certain magnetic potential profile vs. vertical axis (y) and it settles at the equilibrium levitation height ($y_0$). See also Gunawan et al., "The one-dimensional camelback potential in the parallel dipole line trap: Stability conditions and finite size effect," J. Applied Physics, vol. 121, 133902 (April 2017) (10 pages) (hereinafter "Gunawan 2017"), the contents of which are incorporated by reference as if fully set forth herein. However, as shown in FIG. 2, as the levitation height of the diamagnetic rod decreases, e.g., to a (second) levitation height $y_0'$, the magnetic potential changes. See, for example, the longitudinal potential for levitation heights 1 and 2, i.e., $y_0$ and $y_0'$, respectively, in FIG. 2. The different levitation heights yield different camelback potentials and, as described above, different oscillation frequency $f_0$ of the diamagnetic rod in the trap. Accordingly, since the levitation height is a function of gravity, then an oscillation frequency measurement can be used to accurately determine the gravitational acceleration. Thus, in general there are two schemes in measuring the local gravitational acceleration: (1) PDL oscillation frequency measurement scheme and (2) diamagnetic object levitation height measurement.

More specifically, using a long (e.g., length greater than 5× radius) PDL and small (e.g., rod radius 5× smaller than the magnet radius) diamagnetic rod approximation, the levitation height $y_0$ is given as (Gunawan 2015):

$$\frac{\rho g a}{\mu_0 M^2} \frac{2+\chi}{\chi} + f_Y(\bar{y}_0) = 0 \qquad (1)$$

$$f_Y(\bar{y}) = 4\bar{y}(3-\bar{y}^2)(1-\bar{y}^2)/(1+\bar{y}^2)^5,$$

wherein M is the magnetization, a is the radius, L the length of the PDL magnet, ρ is the mass density, χ is the magnetic susceptibility of the diamagnetic rod, and g is gravitational acceleration. The bar notation means that the value is normalized to the magnet radius a, i.e., $\bar{y}_0 = y_0/a$. $f_Y$ is the diamagnetic repulsion force prefactor in vertical direction in long magnet limit. Thus, in essence the levitation height is a function of local gravity, magnet properties (M, L, a) and rod properties (χ, ρ): $y_0 = f(g, M, a, L, \chi, \rho)$. See, for example, Gunawan 2015. The oscillation frequency $f_0$ depends on the levitation height $y_0$ and gravitational acceleration g $$f_0 = \frac{1}{2\pi} \sqrt{\frac{g a f_{Z2}(\bar{y}_0, \bar{L})}{L^2 f_Y(\bar{y}_0, \bar{L})}} \qquad (2)$$

$f_{Z2}(y_0, L)$ is the prefactor for the camelback spring constant given as $f_{Z2}(\bar{y},\bar{L}) = 96\bar{L}^4(\bar{L}^2+4\bar{y}^2-16)$ $[8+(\bar{L}^2+4\bar{y}^2)(1-\bar{y}^2)]/[(1+\bar{y}^2)^2 (4+\bar{L}^2+4\bar{y}^2)^5]$ (see Gunawan 2015).

The oscillation frequency $f_0$ can then be correlated with the gravitational acceleration g. See, for example, FIG. 4. As shown in FIG. 2, an increase in gravitational acceleration g will: i) decrease the levitation height $y_0$ (see also FIG. 3), ii) increase the camelback potential strength, and iii) increase the oscillation frequency $f_0$ (see also FIG. 4). For instance, in the example given in FIG. 4, a unit of fractional change in gravity g will give a change in the oscillation frequency $f_0$ given as $(\Delta f_0/f_0)/(\Delta g/g) = 0.358$. Thus in essence this system provides a Frequency Modulation (FM) system where the rod oscillation frequency is sensitive to a change in gravity field, which is an attractive feature since FM detection is an excellent system for signal transmission or extraction (as opposed to, for example, amplitude modulation).

The minimal amount of change in gravity g that can be detected is referred to herein as the noise floor. The noise floor $a_n$ of the present gravimeter is given as:

$$a_n = \sqrt{\frac{4k_B T \omega_0}{Qm}} \text{ (Hz}^{-0.5}\text{)}, \tag{3}$$

wherein m is the mass of the trapped rod, Q is the quality factor given as: $Q=\pi f_0 \tau$, wherein $\tau$ is the damping time constant. For example, an exemplary test of a PDL trap in a high vacuum chamber has the following parameters: Q=25,000, $f_0$=0.64 Hz, and graphite m=22.6 μgr, which provides a noise floor of: $a_n$=3.5×10$^{-11}$ g/√Hz, which is very low. To increase the accuracy, the damping time constant t can be adjusted. One way to adjust $\tau$ is by adjusting the dimensions, i.e., diameter and length, of the diamagnetic rod. For example, when the trapped diamagnetic rod is displaced, it tends to oscillate at the center of the PDL trap. See, for example, FIG. 8 of Gunawan 2017 which shows the rod oscillation on the 1D camelback potential extracted from video. However the oscillation is damped due to air friction. See, for example, U.S. patent application Ser. No. 14/826,934 by Gunawan et al., entitled "Parallel Dipole Line Trap Viscometer and Pressure Gauge" (hereinafter "U.S. patent application Ser. No. 14/826,934"), the contents of which are incorporated by reference as if fully set forth herein, and Gunawan 2017. As described in U.S. patent application Ser. No. 14/826,934, the damping is more severe (damping becomes stronger) as the diameter of the rod becomes smaller, i.e., the damping time constant t decreases with smaller rod diameter. Conversely, $\tau$ increases (damping becomes weaker) with a larger diameter rod. The damping time constant $\tau$ also increases with a longer rod. See also, U.S. patent application Ser. No. 15/219,725 by Gunawan et al., entitled "Parallel Dipole line Trap Seismometer and Vibration Sensor," the contents of which are incorporated by reference as if fully set forth herein. Another way to increase the damping time constant and thus the Q-factor is by enclosing the trap in a vacuum enclosure (see below). This will remove the viscous air drag or damping on the rod.

Figure 5:
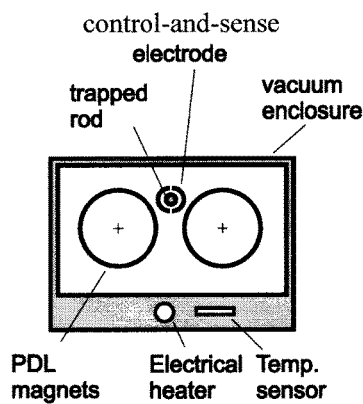
FIG. 5 is a front view diagram of the present gravimeter according to an embodiment of the present invention.
Figure 6:
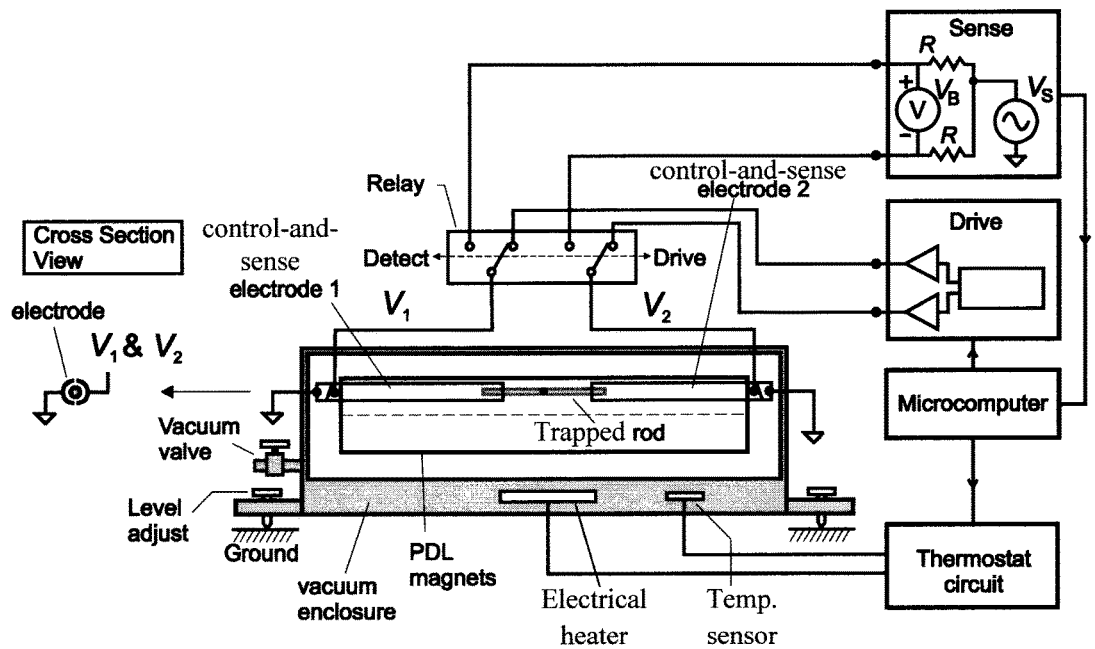
FIG. 6 is a side view diagram of the present gravimeter and the drive and sense circuitry according to an embodiment of the present invention.
Figure 7:
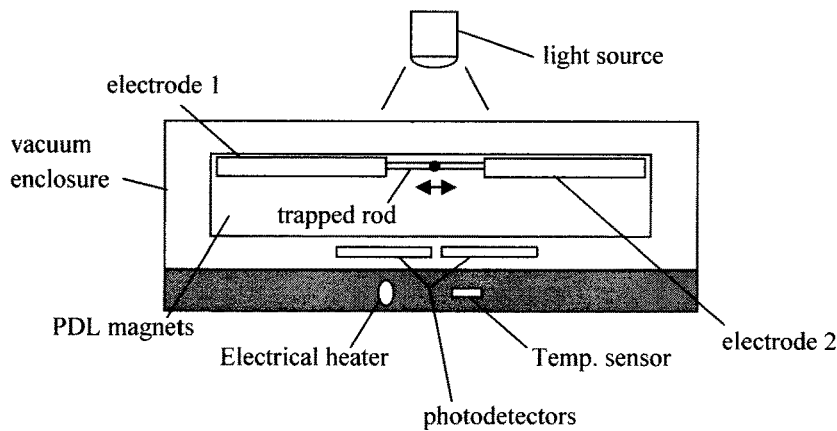
FIG. 7 is a side view diagram of the present gravimeter using optical sensing according to an embodiment of the present invention.

The basic set-up of the present gravimeter is now described by way of reference to FIG. 5 (front view) and FIG. 6 (side view). In FIGS. 5 and 6, capacitive sensing is used to determine a position of the rod in the PDL trap. FIG. 7, described below, depicts an alternative sensing scheme employing a light source and photodetectors. As shown in FIGS. 5 and 6, the present gravimeter includes a PDL trap having a pair of transverse cylindrical magnets (labeled "PDL magnets") and a trapped object (such as a trapped rod) levitating above the PDL magnets. At least one electrode (labeled "control-and-sense electrode") is positioned above the PDL magnets surrounding the trapped rod. As will be described in detail below, the at least one electrode is used to both manipulate and detect the position of the rod, i.e., as per the techniques described in U.S. patent application Ser. No. 15/131,443 by Oki Gunawan, entitled "Voltage-Tunable 1D Electro-Magnet Potential and Probe System with Parallel Dipole Line Trap" (hereinafter "U.S. patent application Ser. No. 15/131,443"), the contents of which are incorporated by reference as if fully set forth herein. In this example, a cylindrical case electrode is depicted. See, for example, FIGS. 8 and 9 of U.S. patent application Ser. No. 15/131,443. However, any electrode design/configuration described in U.S. patent application Ser. No. 15/131,443 may be employed herein.

As provided above, the gravimeter can be enclosed in a vacuum chamber to remove viscous drag on the rod and thereby increase the damping time constant (or the quality Q factor) and sensitivity of the device. Thus, in the examples depicted in FIGS. 5, 6, and 7 the gravimeter is contained within a vacuum enclosure.

Further, readings taken at different temperatures can vary due to temperature drift. Temperature drift can affect the readings because thermal expansion of the magnet assembly may alter its dimensions (such as the gap between the magnets) and thereby affect the magnetic confinement potential and the oscillation frequency of the trap. Thus, in order to eliminate the temperature drift factor, readings from the device are preferably all taken at the same elevated temperature. For example, as shown in FIGS. 5, 6, and 7 the gravimeter includes an electrical heater and a temperature sensor (temp. sensor). As shown in FIG. 6, the electrical heater and temperature sensor are connected to a thermostat circuit (under the control of a microcomputer) for maintaining the environment with the vacuum enclosure at a constant elevated temperature. By "elevated" it is meant that the temperature within the vacuum enclosure is maintained above ambient external temperatures (i.e., temperatures outside of the vacuum enclosure) in the environment in which the gravimeter is used. For instance, when used in the field the vacuum chamber is maintained at a higher temperature than the surrounding environmental (i.e., indoor/outdoor) temperatures. That way, the gravimeter operates at a constant temperature regardless of the external temperatures.

By way of example only, the temperature within the vacuum enclosure is maintained (via the electrical heater, temperature sensor, and thermostat circuit) to be at a constant temperature of from about 30° C. to about 80° C., and ranges therebetween. For example, according to an exemplary embodiment, the temperature within the vacuum enclosure is constantly maintained at about 40° C. A thermostat circuit is used where the temperature sensor provides feedback to the electrical heater by sensing the temperature within the vacuum enclosure, and turning the heater on/off when needed. The electrical heater and temperature sensor are within the enclosure so as to maintain the internal temperature of the chamber.

As described above, the manipulation (FIGS. 5, 6, and 7) and optionally also detection (FIGS. 5 and 6) of the position of the diamagnetic rod in the PDL trap can be achieved using at least one electrode placed above the PDL trap (also referred to herein as a top electrode). In the example depicted in FIGS. 5, 6, and 7, the electrodes are cylindrical case electrodes. As described in U.S. patent application Ser. No. 15/131,443, cylindrical case electrodes at least partially surround the trapped diamagnetic rod. Specifically, as shown in instant FIG. 5, the cylindrical case electrode is configured as two semi-circular halves (or shells) which are in a non-contact position relative to one another and partially surround the diamagnetic rod such that the diamagnetic rod is present between the two halves of the electrodes. While the cylindrical case electrode design is advantageous because it enhances the capacitance and thus lowers the voltage requirement, other electrode configurations are described in U.S. patent application Ser. No. 15/131,443 which may be implemented in the same manner in accordance with the present techniques. For instance, rather than a cylindrical case electrode, a solid electrode(s) can be implemented wherein the diamagnetic rod passes between the electrode(s) and the PDL magnets. See, for example, FIG. 4 of U.S. patent application Ser. No. 15/131,443.

Using the principles detailed in U.S. patent application Ser. No. 15/131,443, oscillation of the diamagnetic rod can be initiated using an electrode "drive" unit by applying a positive bias voltage to the "control-and-sense electrodes." This will change the position of the diamagnetic rod in the PDL trap. For instance, the applied voltage will draw the diamagnetic rod towards the electrode. Thus, to use FIG. 6 as an example, if a bias voltage $V_1$ is applied to the control-and-sense electrode on the left side of the PDL trap (control-and-sense electrode 1), then the diamagnetic rod will be drawn to the left side of the trap. Removal of the bias voltage $V_1$ from control-and-sense electrode 1 will then cause the diamagnetic rod to restore its position to the equilibrium. Specifically, at rest the diamagnetic rod will sit above the center of the PDL trap due to the symmetric camelback potential. Applying a bias voltage $V_2$ to the control-and-sense electrode 2 will have the same effect, only the diamagnetic rod will be drawn to the right side of the trap, and so on. Thus, by applying voltages $V_1$ and $V_2$ to both electrodes consecutively and periodically with a frequency equal to the natural frequency of the camelback potential, the rod will be driven into resonant oscillation.

In addition to manipulating movement of the diamagnetic rod in the PDL trap, the control-and-sense electrodes can also be used to detect the position of the rod in the PDL trap using capacitive sensing techniques in RC bridge configurations as shown in FIG. 6 (see "Sense" unit). A relay is used to switch the left and right control-and-sense electrodes 1 and 2 from "Drive" circuitry to "Sense" circuitry (e.g., in this example toggling the relay to the left will engage the "Sense" circuitry and to the right will engage the "Drive" circuitry). In this RC bridge technique, the capacitance between the two half shells of the control-and-sense electrodes is measured. As the diamagnetic rod moves in the PDL trap in between the two half shells, the capacitance increases. Hence, by measuring the voltage amplitude $V_B$ across the RC bridge one can determine the position of the rod in the PDL trap. See, for example, U.S. patent application Ser. No. 15/131,443. While a single control-and-sense electrode may be used, in order to sense a greater range of motion of the diamagnetic rod, a pair of control-and-sense electrodes is employed, one at each end of the PDL trap. See, for example, FIG. 6 where control-and-sense electrode 1 and control-and-sense electrode 2 are located at opposite ends of the PDL trap enclosing the trapped diamagnetic rod. Two resistors (R) form a resistor-capacitor (R-C) bridge with the control-and-sense electrodes 1 and 2. An AC voltage source $V_S$ is connected to the RC bridge and to ground. An AC voltmeter is connected to control-and-sense electrodes 1 and 2 to measure the "R-C bridge" voltage $V_B$. The R-C network in each branch serves as a voltage divider. Thus, by measuring the differential voltage between control-and-sense electrodes 1 and 2 one can measure the voltage imbalance in the bridge and deduce the diamagnetic rod displacement.

The diamagnetic rod displacement data is fed to a microcomputer (see, for example, FIG. 6 where the signal output $V_B$ from the AC voltmeter is collected by the microcomputer) which computes the oscillation frequency $f_0$ of the signal. Using the oscillation frequency $f_0$ (or period $T_z$) the microcomputer can then calculate the gravitational acceleration using Equation 2 as plotted in FIG. 4.

As provided above, capacitive sensing is only one of a number of different techniques contemplated herein for detecting the position of the diamagnetic rod in the PDL trap. For instance, according to an alternative embodiment, the position of the diamagnetic rod in the PDL trap is detected using optical sensing via a plurality of photodetectors, or a monolithic split-photodetectors, and a light source as shown in FIG. 7. Split (or segmented)-photodetectors are monolithic photodetectors (i.e., they share a common substrate) but which are segmented into multiple segments, each segment having its own contact terminals. Split-photodetectors are useful for precision differential light sensing. Split/segmented photodetectors are commercially available, for example, from OSI Optoelectronics, Hawthorne, Calif. As shown in FIG. 7, the light source is placed above the PDL trap, and the photodetectors are placed below the PDL trap. Suitable light sources include, but are not limited to, incandescent light bulb, light emitting diode and/or laser, and suitable photodetectors include, but are not limited to, semiconductor photodetector and/or light-dependent-resistor (LDR).

The light source and the split-photodetectors are used to determine the position of the diamagnetic rod in the PDL trap. Namely, as shown in FIG. 7, as the rod moves within the PDL trap it passes between the light source and the photodetectors. In this example, there are two photodetectors shown. However, this is for illustrative purposes only, and more (or fewer) photodetectors can be employed as needed. If the rod moves to the left side of the trap it will block light from the light source from reaching the photodetector on the left. However, light from the light source will reach the photodetector on the right. If the rod moves to the right side of the PDL trap it will block light from the light source from reaching the photodetector on the right. However, light from the light source will reach the photodetector on the left. See also, U.S. patent application Ser. No. 15/131,566. Thus, the differential output signal from the photodetectors changes depending on the location of the diamagnetic rod in the PDL trap. In this case, the top electrodes will serve to drive or control the position of the diamagnetic rod in the PDL trap (e.g., so as to initiate movement/oscillations of the rod—see above), however rod position sensing is now performed via the light source/photodetectors.

Figure 8:
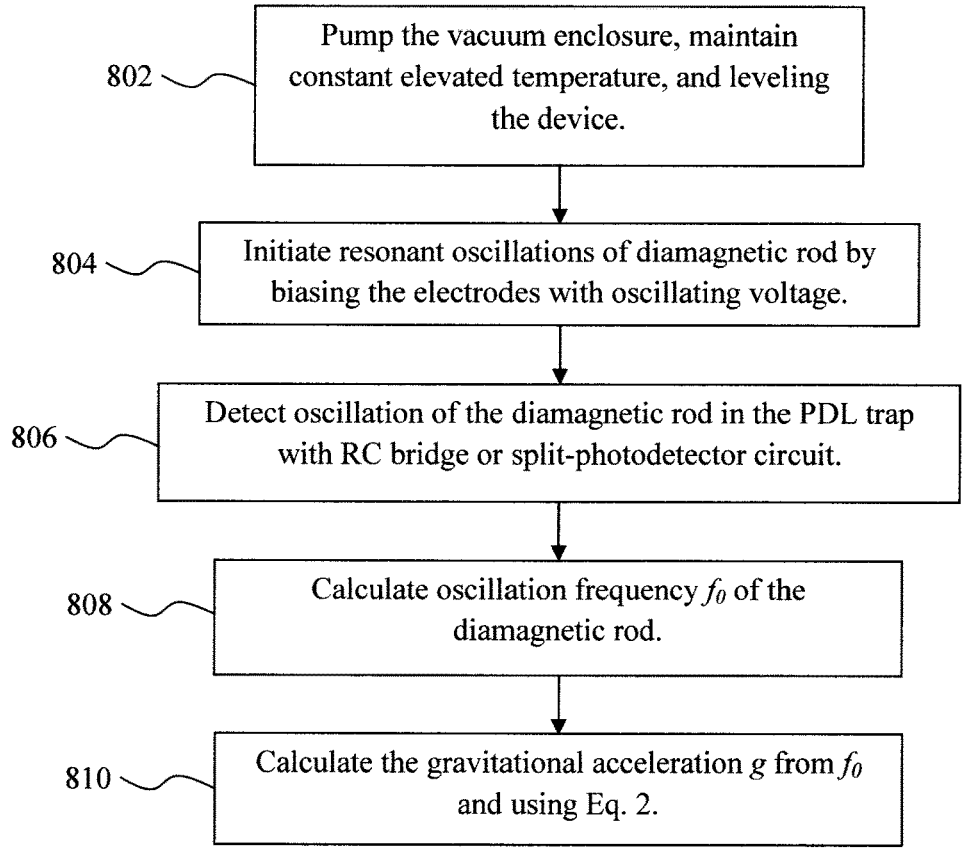
FIG. 8 is a diagram illustrating an exemplary methodology for measuring a local gravitational field using the present gravimeter according to an embodiment of the present invention.

FIG. 8 is a diagram illustrating an exemplary methodology 800 for operating the present gravimeter. In step 802, an environment within the vacuum enclosure is prepared. For instance, in step 802 the enclosure is pumped to reach high vacuum level, the temperature of the enclosure is controlled by the thermostat, and the device is adjusted to be as horizontal as possible (i.e., level) using level adjusters (e.g., adjustment screws) mounted for instance on at least two ends of the enclosure (see, e.g., FIG. 6) to level of the device. For example, as provided above, the temperature in the vacuum enclosure is controlled, via the electrical heater and temperature sensor, to provide a constant elevated temperature within the vacuum enclosure. The highest possible vacuum level is preferred such as pressure $P<10^{-5}$ Torr—to obtain the highest possible quality (Q) factor. In very high vacuum, the energy dissipation due to surrounding gas is minimized and thus the Q factor increases. Level adjustment is also very important as the rod oscillation frequency is also influenced by the inclination. Thus to obtain reproducible results, it is important to maintain the same inclination, i.e., ideally zero inclination or perfect horizontal.

By way of example only, during operation, the vacuum enclosure is maintained at a constant elevated temperature above the ambient temperature, e.g., the vacuum enclosure is maintained at a temperature of from about 30° C. to about 80° C., and ranges therebetween, e.g., at about 40° C.

In step 804, oscillation of the diamagnetic rod is initiated. As provided above, this can be accomplished by applying a bias voltage oscillation to the control-and-sense electrodes 1 and 2 which displaces the diamagnetic rod in the PDL trap. When the bias voltage is stopped, the diamagnetic rod will continue the oscillation until it dies down.

In step 806, the movement of the diamagnetic rod as it oscillates in the trap is detected. As provided above, oscillation of the diamagnetic rod can be detected using capacitive sensing with an R—C bridge technique or a split-photodetection technique.

Figure 4:
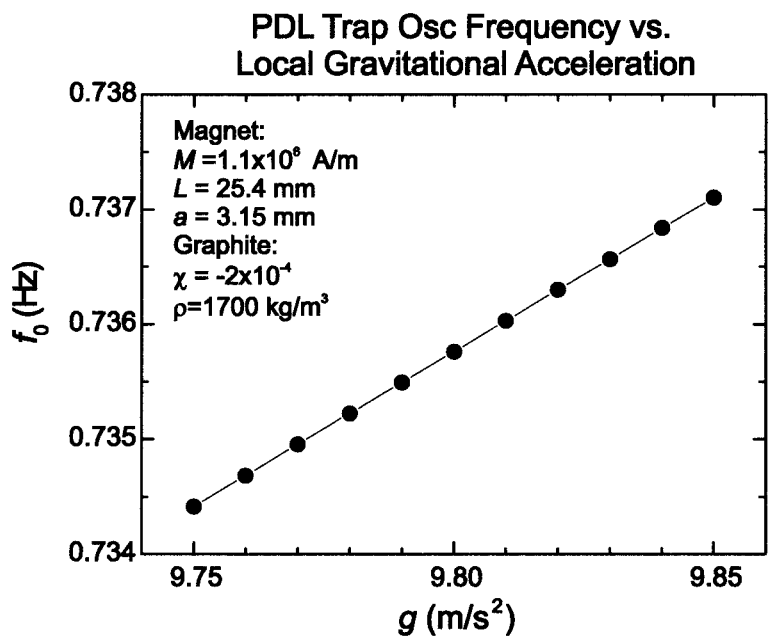
FIG. 4 is a plot correlating PDL trap oscillation frequency $f_0$ with local gravitational acceleration g according to an embodiment of the present invention.

In step 808, the diamagnetic rod movement data (from step 806) is used to compute the oscillation frequency $f_0$ as a function of displacement of the diamagnetic rod in the PDL trap, and in step 810, the frequency $f_0$ is used to calculate the gravitational acceleration g as per Equation 2, above and as illustrated in the plot of FIG. 4. As described above, these calculations can be performed by the microcomputer which also receives the oscillation data directly from the R-C bridge or split-photodetector circuit.

As provided above, once displaced to induce movement (see for example step 804 of methodology 800) the diamagnetic rod will oscillate back and forth in the PDL trap. However, these oscillations will decrease over time due to damping (e.g., mainly due to air friction or gas viscosity). See FIG. 3a of Gunawan 2015. Ideally, the oscillations would be maintained to enable more precise frequency measurements over a longer period of time (e.g., achieving 1,000 cycles or more). Advantageously, an optional auto-tuning oscillator and frequency modulation (FM) detector circuit is provided herein for sustaining long oscillations and detection of the change in frequency. See, for example, FIG. 9 which shows the present PDL trap-based gravimeter in combination with an auto-tuning oscillator circuit (or simply "auto-oscillator") and FM demodulator circuit. It is notable that in this example an optical detection scheme (i.e., light source and split-photodetectors) is used to track the position of the diamagnetic rod in the PDL trap, and thus the electrodes only control the position of the rod.

Figure 9:
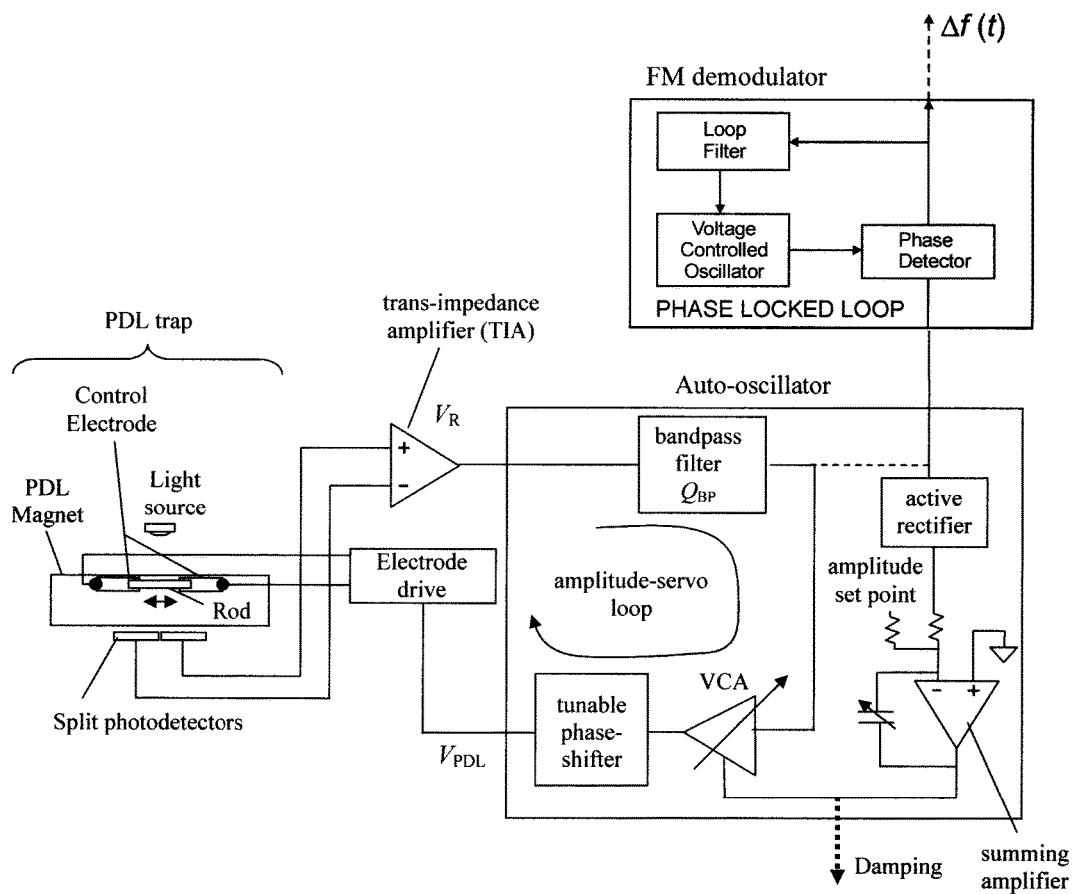
FIG. 9 is a diagram illustrating an exemplary configuration of the present gravimeter with an auto-tuning oscillator and frequency demodulator according to an embodiment of the present invention.

As shown in FIG. 9, the detection of the PDL oscillation frequency and damping can be realized using a frequency modulation (FM) detection method. In this scheme, the PDL trap system is a frequency limiting element (or filter) in an auto-oscillator circuit with the drive voltage (i.e., the above-described bias voltage applied to the top electrodes and the PDL magnets) to the PDL ($V_{PDL}$) top electrodes as the input, and the (position) signal from the photodetectors as the output. In general, the system functions by determining the position of the diamagnetic rod (in this case using the photodetectors), amplifying this signal from the photodetectors, determining the amplitude of the signal and, if the amplitude starts to decay, using a voltage-controlled amplifier (VCA) to boost the signal while providing feedback to the control electrodes to keep the diamagnetic rod oscillating.

Figure 10:
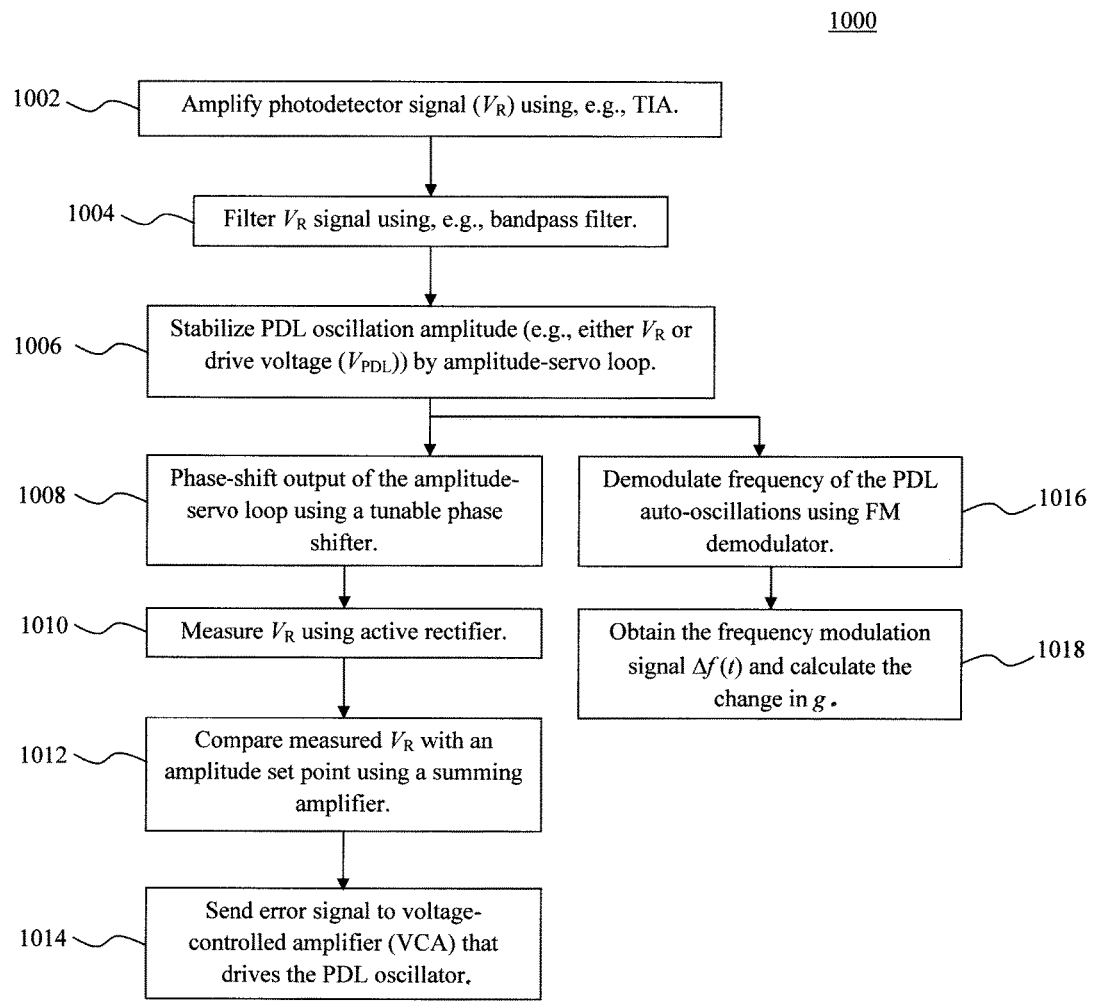
FIG. 10 is a diagram illustrating an exemplary methodology for operating the present gravimeter having an auto-tuning oscillator and frequency demodulator according to an embodiment of the present invention.

Specifically, as shown in FIG. 9 and as described in conjunction with the description of methodology 1000 of FIG. 10, in step 1002 the output current from the photodetectors (which changes as the diamagnetic rod passes between the light source and the photodetectors—see above) is amplified by a trans-impedance amplifier (TIA) and in step 1004 the signal is filtered by a bandpass filter which might reject higher harmonics of the PDL oscillation. In step 1006 the PDL oscillation amplitude, as monitored either by the drive voltage ($V_{PDL}$) or the photodetector signal ($V_R$), is stabilized by a high-gain, amplitude-servo (i.e., closed) loop. The output of the amplitude-servo loop is phase-shifted by a tunable phase-shifter in step 1008.

The oscillation-amplitude-servo loop measures $V_R$ or $V_{PDL}$ with an active full-wave rectifier (step 1010), compares this with an amplitude set point in a summing amplifier (step 1012), and sends the error signal (i.e., the difference between $V_R$ or $V_{PDL}$ and the set point) to a voltage-controlled amplifier (VCA) that drives the PDL (step 1014). The size of this error signal is the loss of the PDL oscillation amplitude and thus directly proportional to the damping. Thus, knowing the magnitude of the damping, the electrode voltage drive $V_{PDL}$ can be varied to maintain the oscillations of the diamagnetic rod via the above-described electrode "drive" unit. This drive unit will translate and amplify the $V_{PDL}$ input signal to both control electrodes. For example, when $V_{PDL}$ is positive the left voltage will be amplified to drive the left electrode and when $V_{PDL}$ is negative the voltage will be inverted and amplified to drive the right electrode. The electrodes only take positive voltage to drive the trapped rod. In the steady state, the output electrode voltage bias is applied in such a way that the applied force is in phase with the natural oscillation of the trapped rod.

To read the oscillation frequency from the system, in step 1016 the frequency of the PDL auto oscillation is demodulated with an FM demodulator/phase detector for example using a Phase-Locked Loop (PLL) circuit. For this, a replica of the oscillation signal is passed through the tunable bandpass filter and fed to the PLL circuit. The PLL circuit yields frequency modulation signal $\Delta f$ (t) from the phase detector. From this signal one can calculate the change in the gravitational acceleration given the known relationship between the frequency and the gravitational acceleration g as shown in FIG. 4. See step 1018.

Figure 11:
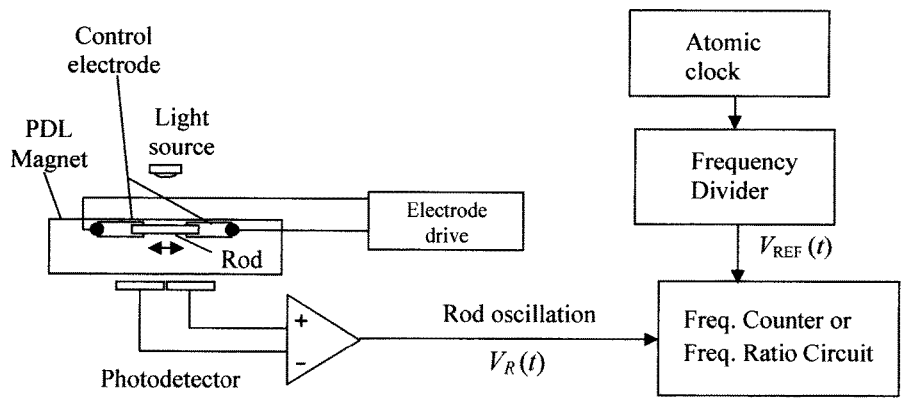
FIG. 11 is a diagram illustrating frequency measurements using atomic clock as a time base reference according to an embodiment of the present invention.

The technique described in FIGS. 9 and 10 allows one to detect a very small change in the frequency and thus the change in the local gravity as a function of time. Alternatively, it is desirable to have very precise measurement of the absolute number g itself, e.g., below 100 parts per billion per $Hz^{0.5}$ (100 ppb) level, so that local changes in gravity can be resolved as the device is moved from one location to another. This small change in local gravity from one location to another can be due, for instance, to the presence of materials of different density such as oil, minerals, magma in a volcano, a tunnel, or even deformation of earth crust or the earth's tide. One technique contemplated herein for obtaining precision frequency measurements uses a frequency counter instrument as shown in FIG. 11 through the use of long oscillation measurement comprising many cycles, e.g., wherein the number of cycles ($N_C$) is 1,000 cycles, or more. That way, any local variations can be averaged out over the (long) oscillation cycle period. The period $T_z$ can then be determined by:

$$T_z = \Delta t / N_C, \quad (4)$$

wherein t is time and $N_C$ is the number of cycles and which is preferably a large number (e.g. >1,000). The frequency is given as: $f_0 = 1/T_z$. However, like with most frequency counters, the accuracy would be based on the stability of the reference timebase. Therefore an extremely stable reference timebase can be used such as that derived using an atomic clock chip.

According to another alternative technique for precision frequency measurement, one could also perform frequency ratio operation as shown in FIG. 11 with the atomic clock as the frequency reference standard, which provides an extremely precise frame of reference to which to compare the frequency of the oscillation signal from the PDL gravimeter. In this example, the oscillation signal ($V_R$) output from the PDL trap (i.e., $f_0$) and a reference frequency signal output from an atomic clock (i.e., $f_{REF}$) are sampled simultaneously and fed to a Frequency (Freq.) Ratio Circuit which outputs the ratio, i.e., $$k_R = f_0/f_{REF}. \quad (5)$$

A Frequency Divider circuit can be employed to scale down the atomic clock raw frequency to a reference frequency $f_{REF}$ which is close to the operating frequency $f_0$ to avoid an extremely small ratio number.

Figure 12:
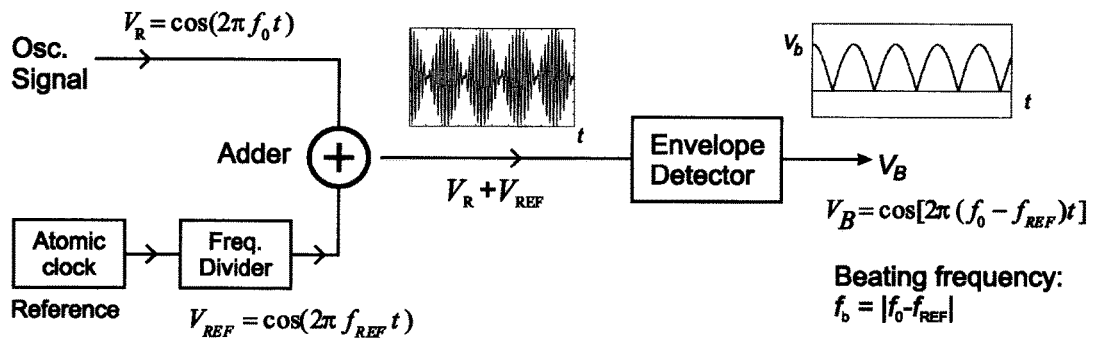
FIG. 12 is a diagram illustrating frequency beating measurements using a reference signal from an atomic clock reference according to an embodiment of the present invention.

Yet another technique contemplated herein to increase precision is to use a frequency beating measurement scheme as shown in FIG. 12. In FIG. 12, the raw oscillation signal $V_R(t)$ is obtained from the PDL trap (e.g., via the split-photodetectors) and a stable reference signal $V_{REF}(t)$, with a frequency close to the signal $V_R(t)$, is derived from a stable reference clock such as an atomic clock. These signals are combined via an adder and, after filtering out the high-frequency component using an envelope detector, a beat signal ($V_B$) is produced which has a fundamental frequency of $f_B = |f_0 - f_{REF}|$. From measurement of this beating frequency $f_B$ one can deduce the original oscillation frequency $f_0$ that will be used to calculate the acceleration of gravity g.

As mentioned above, another scheme to measure the local gravitational acceleration involves measuring the levitation height of the rod. FIG. 3 shows the monotonic behavior of the levitation height $y_0$ that decreases with increasing g. Thus precision measurement of levitation height $y_0$ will yield g. In this alternative scheme one can employ a setup as shown, for example, in FIG. 13. For instance, a light source is mounted on the left (or right) of the trap illuminating the levitating rod, and its shadow is cast on the split photodetectors on the right (or left) similar to the scheme illustrated in FIG. 9. The differential photocurrent is then amplified by a trans-impedance amplifier (TIA) that yields a voltage $V_H$ that corresponds to the change in levitation height from which the change in local gravitational acceleration g can be calculated.

Turning now to FIG. 14, a block diagram is shown of an apparatus 1400 that can be configured to serve as the microcomputer in the present gravimeter device. Apparatus 1400 includes a computer system 1410 and removable media 1450. Computer system 1410 includes a processor device 1420, a network interface 1425, a memory 1430, a media interface 1435 and an optional display 1440. Network interface 1425 allows computer system 1410 to connect to a network, while media interface 1435 allows computer system 1410 to interact with media, such as a hard drive or removable media 1450.

Processor device 1420 can be configured to implement the methods, steps, and functions disclosed herein. The memory 1430 could be distributed or local and the processor device 1420 could be distributed or singular. The memory 1430 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1420. With this definition, information on a network, accessible through network interface 1425, is still within memory 1430 because the processor device 1420 can retrieve the information from the network. It should be noted that each distributed processor that makes up processor device 1420 generally contains its own addressable memory space. It should also be noted that some or all of computer system 1410 can be incorporated into an application-specific or general-use integrated circuit.

Optional display 1440 is any type of display suitable for interacting with a human user of apparatus 1400. Generally, display 1440 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A gravimeter, comprising:
   a vacuum enclosure;
   a parallel dipole line (PDL) trap within the vacuum enclosure, the PDL trap having a pair of dipole line magnets, and a diamagnetic rod levitating in between the dipole line magnets;
   a heater within the vacuum enclosure;
   a temperature sensor within the vacuum enclosure;
   a thermostat circuit connected to the heater and the temperature sensor and configured to maintain a constant temperature within the vacuum enclosure that is greater than a temperature outside of the vacuum enclosure; and
   level adjusters configured to level the gravimeter.

2. The gravimeter of claim 1, further comprising:
   at least one electrode over the PDL trap.

3. The gravimeter of claim 2, wherein the at least one electrode comprises two semi-circular halves in a non-contact position relative to one another and which partially surround the diamagnetic rod such that the diamagnetic rod is present between the two semi-circular halves.

4. The gravimeter of claim 2, further comprising:
   multiple electrodes above the PDL trap; and
   resistors that form a double resistor-capacitor bridge with the multiple electrodes.

5. The gravimeter of claim 2, further comprising:
   a light source above the PDL trap; and
   at least one photodetector beneath the PDL trap, opposite the light source, wherein the at least one photodetector is configured to detect a position of the diamagnetic rod in the PDL trap as the diamagnetic rod passes between the light source and the at least one photodetector.

6. The gravimeter of claim 5, wherein the light source is selected from the group consisting of: an incandescent light bulb, a light emitting diode, a laser, and combinations thereof.

7. The gravimeter of claim 5, wherein the at least one photodetector is selected from the group consisting of: a semiconductor photodetector, a light-dependent-resistor, and combinations thereof.

8. The gravimeter of claim 5, further comprising:
   an auto-oscillator connected to the PDL trap, wherein the auto-oscillator comprises a voltage-controlled amplifier in an amplitude-servo loop connected to the at least one electrode and the at least one photodetector.

9. The gravimeter of claim 8, further comprising:
   a frequency modulation (FM) demodulator connected to the PDL trap and the auto-oscillator.

10. The gravimeter of claim 9, wherein the FM demodulator comprises a phase-locked loop circuit configured to extract at least one of: i) a frequency modulation signal or ii) a change in PDL trap oscillation frequency.

11. The gravimeter of claim 5, further comprising:
    an atomic clock configured to serve as a stable reference oscillation signal; and
    a frequency counter or a ratio circuit connected to the atomic clock and an oscillation signal of the PDL trap.

12. The gravimeter of claim 2, further comprising:
a light source on one end of the PDL trap configured to illuminate the diamagnetic rod; and
photodetectors on another end of the PDL trap opposite the light source configured to detect a shadow of the diamagnetic rod.

13. The gravimeter of claim 1, wherein the level adjusters comprise adjustment screws mounted on at least two ends of the vacuum enclosure.

14. A method for measuring a local gravitational field, comprising:
providing a gravimeter including a vacuum enclosure, a parallel dipole line (PDL) trap within the vacuum enclosure, a heater within the vacuum enclosure, and a temperature sensor within the vacuum enclosure, wherein the PDL trap has a pair of dipole line magnets, and a diamagnetic rod levitating in between the dipole line magnets;
maintaining a constant temperature within the vacuum enclosure that is greater than a temperature outside of the vacuum enclosure using the heater;
initiating oscillations of the diamagnetic rod in the PDL trap;
determining an oscillation frequency $f_0$ of the diamagnetic rod in the PDL trap; and
calculating the local gravitational field using $f_0$, wherein $f_0$ varies depending on a levitation height of the diamagnetic rod in the PDL trap, and wherein the levitation height of the diamagnetic rod varies depending on the local gravitational field.

15. The method of claim 14, wherein the constant temperature within the vacuum enclosure is from 30° C. to 80° C., and ranges therebetween.

16. The method of claim 14, further comprising:
detecting movement of the diamagnetic rod in the PDL trap.

17. The method of claim 16, wherein the gravimeter further includes at least one electrode over the PDL trap, and wherein detecting movement of the diamagnetic rod in the PDL trap comprises:
detecting capacitance changes between the at least one electrode and the pair of dipole line magnets as the diamagnetic rod moves in the PDL trap.

18. The method of claim 16, wherein the gravimeter further includes a light source above the PDL trap and at least one photodetector beneath the PDL trap, opposite the light source, and wherein detecting movement of the diamagnetic rod in the PDL trap comprises:
detecting a position of the diamagnetic rod in the PDL trap as the diamagnetic rod passes between the light source and the at least one photodetector.

19. The method of claim 16, wherein the gravimeter further includes: a light source on one end of the PDL trap configured to illuminate the diamagnetic rod, and photodetectors on another end of the PDL trap opposite the light source configured to detect a shadow of the diamagnetic rod, the method further comprising:
measuring a height of the diamagnetic rod.

20. The method of claim 14, wherein the gravimeter further includes at least one electrode over the PDL trap, and wherein initiating the oscillations of the diamagnetic rod in the PDL trap comprises:
applying a bias voltage to the at least one electrode and the pair of dipole line magnets to change a position of the diamagnetic rod in the PDL trap.

21. The method of claim 20, wherein the gravimeter further includes a light source above the PDL trap and at least one photodetector beneath the PDL trap, the method further comprising:
measuring a signal ($V_R$) from the at least one photodetector as the diamagnetic rod passes between the light source and the at least one photodetector;
comparing $V_R$ with an amplitude set point, wherein a difference between $V_R$ and the amplitude set point is proportional to damping of the diamagnetic rod; and
varying the bias voltage applied to the at least one electrode and the pair of dipole line magnets to overcome the damping of the diamagnetic rod and thus maintain the oscillations of the diamagnetic rod in the PDL trap.

22. The method of claim 21, wherein the bias voltage applied to the at least one electrode and the pair of dipole line magnets is varied using a voltage-controlled amplifier.

23. The method of claim 21, further comprising:
demodulating an oscillation frequency $f_0$ of the diamagnetic rod in the PDL trap using an FM demodulator comprising a phase-locked loop circuit.

24. The method of claim 21, wherein the gravimeter further includes an atomic clock, the method further comprising:
performing frequency counting of oscillations of the PDL trap with the atomic clock as a reference time base; and
comparing the oscillations of the PDL trap with the atomic clock as the reference time base to determine a frequency ratio.

* * * * *